United States Patent [19]

Drachenberg et al.

[11] Patent Number: 4,603,084
[45] Date of Patent: Jul. 29, 1986

[54] ARTICLE OF MANUFACTURE WITH A CONNECTING ELEMENT AND METHOD FOR SECURING THE ELEMENT TO THE ARTICLE

[75] Inventors: Franz Drachenberg, Baldham; Walter Oefner, Mitterdarching, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 632,422

[22] Filed: Jul. 19, 1984

[30] Foreign Application Priority Data

Aug. 2, 1983 [DE] Fed. Rep. of Germany ....... 3327803

[51] Int. Cl.$^4$ .................. B65H 81/00; G05G 1/00
[52] U.S. Cl. .................. 428/377; 74/579 R; 156/166; 156/172; 428/378
[58] Field of Search ............... 156/169, 172, 173, 175, 156/166; 416/134 A, 134 R; 74/579 R, 581; 428/377, 378; 242/7.02

[56] References Cited

U.S. PATENT DOCUMENTS

| | | | |
|---|---|---|---|
| 3,282,757 | 11/1966 | Brussee | 156/173 |
| 3,362,253 | 1/1968 | Ditlingen | 416/734 A |
| 4,183,261 | 1/1980 | Eiselbrechen et al. | 74/579 R |
| 4,354,888 | 10/1982 | Bompard et al. | 156/425 |

Primary Examiner—Michael Ball
Attorney, Agent, or Firm—W. G. Fasse; D. H. Kane, Jr.

[57] ABSTRACT

A connecting element, such as a bearing shell, is secured to and end of an article of manufacture having a large length relative to its diameter, by a combination of fiber strands or belts forming at least one loop, the ends of which form slings or bights which are anchored to the article by the turns of an anchoring winding extending around the article and through the slings or bights. The loop with its slings or bights is made simultaneously with the formation of the anchoring winding. This type of operation is possible because the turns of the anchoring winding hold down the fiber strands or belts as they are doubled-up to form the loop, preferably endless loops.

8 Claims, 3 Drawing Figures

ARTICLE OF MANUFACTURE WITH A CONNECTING ELEMENT AND METHOD FOR SECURING THE ELEMENT TO THE ARTICLE

FIELD OF THE INVENTION

The invention relates to an article of manufacture with a connecting element and to a method for securing the element to the article, such as a rod, bar, tubular member, shaft, or the like. The connecting element may, for example, be a bearing shell for an anti-friction bearing or for a sleeve bearing. The article itself is preferably made of synthetic material such as fiber-reinforced composite synthetic material.

DESCRIPTION OF THE PRIOR ART

It is known to secure a connecting element to one or both ends of an elongated member of fiber composite material by means of an end loop also made of fiber composite material, by anchoring the end loop with the aid of a surrounding winding, also referred to as a radial winding. A synthetic resin which impregnates the fibers forms a bonding after the resin has been cured. The manufacture of such elongated members, for example, a steering rod made of fiber composite materials having secured thereto bearing bushings at both ends, required heretofore two separate manufacturing steps. First, it was necessary to form the end loop by applying unidirected axially extending fiber strands to the end of the elongated member. Thereafter, in a separate operational step the loop forming strands were bandaged by applying the above mentioned radial winding extending around the elongated member and anchoring the loop ends between the so-called radial winding and the surface of the elongated member. This two-step procedure is time consuming and hence does not enhance the production economy.

OBJECTS OF THE INVENTION

In view of the above it is the aim of the invention to achieve the following objects singly or in combination:

to provide an article of manufacture of the type described in which the fiber strands or belts forming the end loop are interlaced or intertwined with the turns of the so-called radial winding for anchoring the end loops;

to provide a method for manufacturing such an article in a single continuous operation; and to construct such an article of fiber composite materials, whereby a continuous fiber thread may be used which is also embedded in a bonding resin material.

SUMMARY OF THE INVENTION

The above objectives have been achieved according to the invention in that the strands or bands forming the end loop are joined together by the turns of the radial winding which pass through slings or bights of the loop forming strands or belts. Preferably, the end loops are formed of one uninterrupted continuous thread which forms the bight or sling around the respective turn of the radial winding, whereby a weave-type structure is accomplished. Thus, each loop has a sling or bight at both ends and may be continuously formed from an endless thread while simultaneously applying the radial winding.

This type of structure not only has the advantage that the loop formation and the anchoring winding formation can take place simultaneously, it also provides a more intimate bonding which has been found to have considerably higher strength characteristics than prior art devices in which the radial or anchoring winding merely ties down the ends of the loop by extending around these ends. The present method may be performed by using simultaneously several thread guide mechanisms or material applying devices which need to perform relatively simple movements correlated to each other.

BRIEF FIGURE DESCRIPTION

In order that the invention may be clearly understood, it will now be described, by way of example, with reference to the accompanying drawings, wherein:

FIG. 3 shows one end of an article in which the loop forming elements comprise fiber belts or the like.

DETAILED DESCRIPTION OF PREFERRED EXAMPLE EMBODIMENTS AND OF THE BEST MODE OF THE INVENTION

Figure 1:
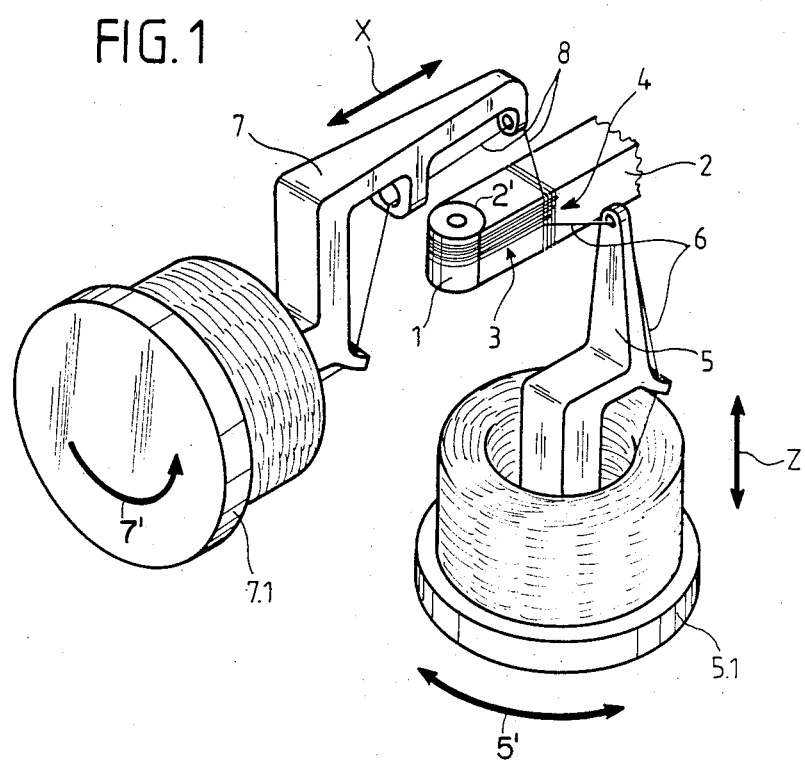
FIG. 1 shows a perspective view of a thread guide mechanism and a winding mechanism for securing a bushing to one end of a rod.
Figure 2:
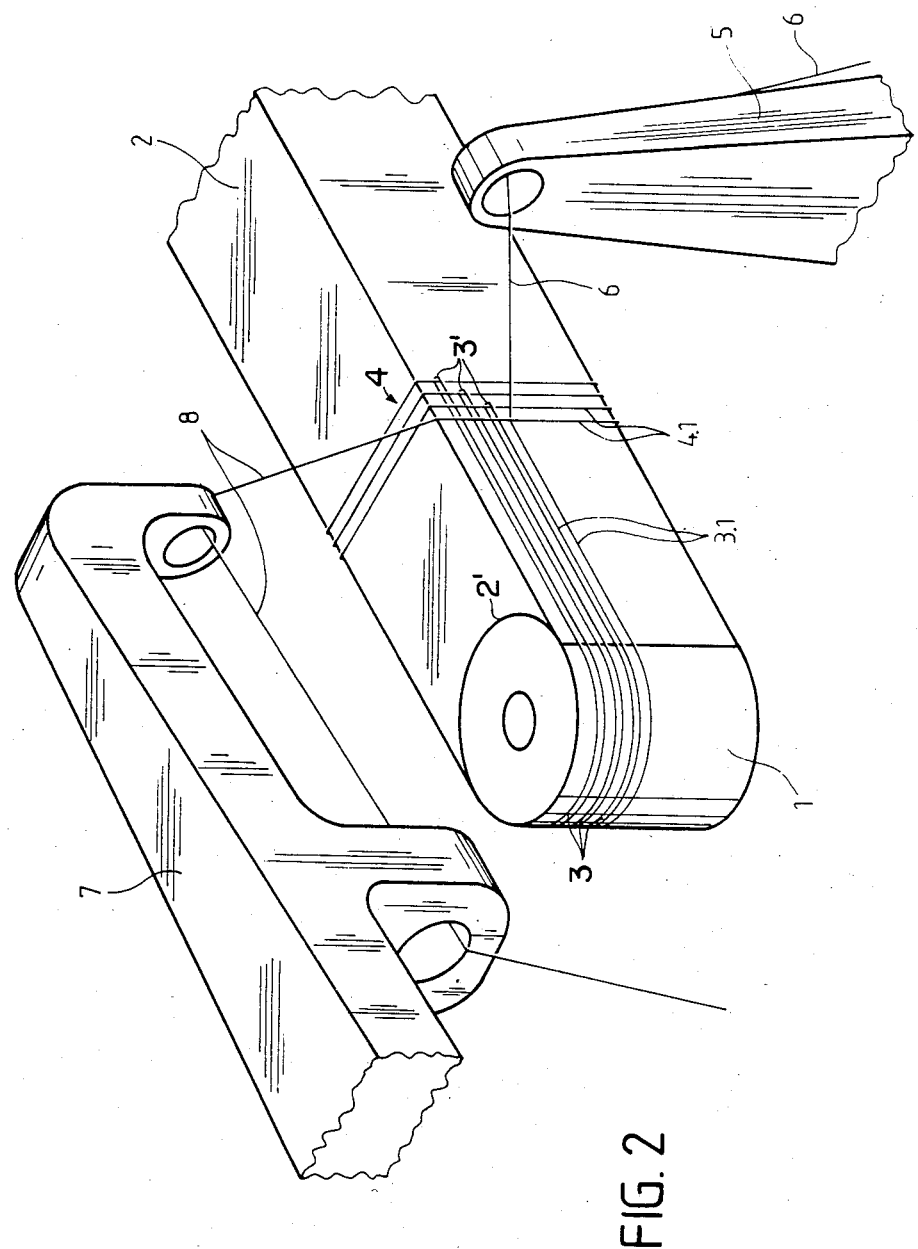
FIG. 2 is a view similar to that of FIG. 1 on an enlarged scale to illustrate the interaction of the loop forming and winding forming threads or fibers.

As shown in FIG. 1 a metal bushing 1 is secured to one end of a rod 2 which is provided with a concave recess 2' for receiving the bushing 1. The bushing 1 is held in place by a plurality of end loops 3 formed of a fiber thread 6 as shown in more detail in FIG. 2. Each loop 3 has loop legs or strands 3.1 which extend in parallel to the longitudinal axis of the rod 2, except where the loops 3 loop around the bushing 1. The thread 6, for example a glass fiber thread or strand, is supplied by a thread guide and feed mechanism 5 which is movable by conventional means up and down as indicated by the arrow Z and which is turnable back and forth about a vertical axis as indicated by the double arrow 5'. The means for driving the thread guide and applying mechanism 5 are conventional and hence not shown. The thread or fiber 6 is preimpregnated by a suitable resin, which after curing, provides the required bonding. When a loop leg 3.1 reaches a position where it may be crossed by a turn 4.1 of the anchoring or radial winding 4, a bight or sling 3' is formed around the respective turn 4.1 as best seen in FIG. 2. Thus, the loops 3 are actually endless loops which have the bights 3.1 on each side of the rod 2. Only the facing side is seen in FIG. 2, but the back side is formed in the same manner.

It will be noted that the legs 3.1 are sections of the fiber strand or thread 6 and these sections are applied without any interruption continuously by the crank type thread guide and feed mechanism 5. In addition to the feed advance movement indicated by the arrow Z, the mechanism 5 merely requires a back and forth tilting or turning movement as indicated by the arrow 5'. The outer limits of this tilting movement are determined by the crossing points where the slings or bights 3' are to be formed on each side of the rod 2.

The turns 4' of the anchoring or radial winding 4 are applied by feeding a fiber or thread 8 through a winding mechanism 7 which requires a back and forth movement as indicated by the double arrow X and which simultaneously rotates as indicated by the arrow 7'. Here again, the drive means for the winding mechanism 7 are not shown since they are well known in the art.

Both mechanisms 5 and 7 may even be operated manually if desired. In any event, the respective drive pulleys 5.1 and 7.1 are operated simultaneously and these drive pulleys 5.1, 7.1 may be mounted in any desirable conventional manner. It will be appreciated from the foregoing, that the loops 3 with their slings or bights 3' are formed simultaneously with the turns 4.1 of the anchoring winding 4. This type of operation results in a weave type interlacing or intertwining of the threads or fibers 6 and 8, whereby an anchoring of the bushing 1 is achieved having considerably better strength characteristics than the above described prior art connections.

Figure 3:
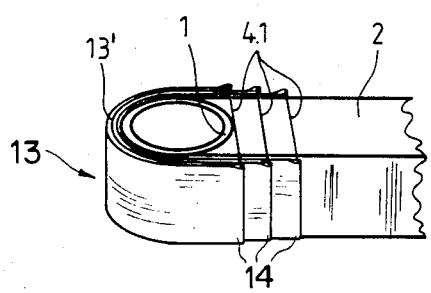

In FIG. 3 the loops 13 are formed as endless belts or tapes 13' of fiber reinforced material. These belts or tapes 13' are doubled up upon themselves to form the bights or slings 14 through which again the turns 4.1 of the anchoring winding extend. The belts or tapes 13' are also made of preimpregnated fiber reinforced material, whereby the belts are nested in each other as shown to form the stepped configuration of the bights or slings 14. Preferably, these tapes or belts 13' have a width corresponding to the axial length of the bushing 1. Basically, the same mechanisms may be used for making the connection shown in FIG. 3 as have been described above with reference to FIGS. 1 and 2.

In yet another modification two fiber strands 6 for forming the loops 3 may be applied simultaneously.

Although the invention has been described with reference to specific example embodiments, it will be appreciated, that it is intended to cover all modifications and equivalents within the scope of the appended claims.

What is claimed is:

1. An article of manufacture having a longitudinal axis, comprising a connecting element (1), a plurality of substantially longitudinally extending fiber loops (3) securing said connecting element (1) to one end of said article (2) so so that said fibers extend substantially in parallel to said longitudinal axis except where the fibers change direction to form said plurality of fiber loops (3) which are formed by a reciprocating motion, and at least one anchoring winding (4) for securing said plurality of fibers loops (3) to said article (2) of manufacture, said anchoring winding being produced by winding anchoring fibers to form a turn simultaneously with said reciprocating loop forming motion so that each longitudinally extending fiber loop is looped around said turn of said anchoring winding for securing the connecting element (1) to the article (2) of manufacture.

2. The article of manufacture of claim 1, wherein said plurality of fiber loops are formed by at least one fiber strand which is doubled-up upon itself to form two fiber loop slings held in place by said anchoring winding.

3. The article of manufacture of claim 2, wherein said anchoring winding comprises at least one turn extending through both slings.

4. The article of manufacture of claim 2, wherein said longitudinally extending fiber loops comprise a plurality of endless loop belts each of which is doubled-up upon itself to form two of said slings by each loop belt, said doubled-up loops belts being nested one within the next to form a nesting assembly from which said slings protrude, said nesting assembly enclosing said connecting element with the slings extending alongside said article of manufacture, said anchoring winding comprising a plurality of turns extending through respective ones of said slings.

5. The article of manufacture of claim 4, wherein said slings are arranged in a stepped fashion along opposite sides of said article of manufacture.

6. The article of manufacture of claim 2, wherein said fiber strand is a fiber belt.

7. A method for securing a connecting element to an end of an elongated article of manufacture having a longitudinal axis, comprising the following steps:
(a) looping a first fiber around the connecting element and onto an end of said article so that the fiber forms at least one loop having four legs extending in parallel to said longitudinal axis to form two slings, and,
(b) simultaneously winding at least one turn of an anchoring winding onto and around said article in such a position that said one turn extends through each sling to hold down a respective leg loop,
(c) whereby the legs loops are turned around the respective anchoring winding turn.

8. The method of claim 7, further comprising impregnating said fiber strand or belt and said anchoring winding with a suitable resin and curing the resin for bonding the fiber strand or belt and the winding turns of the anchoring winding to one another, to the connecting element and to the article.

* * * * *